United States Patent
Xing et al.

(10) Patent No.: US 8,540,902 B2
(45) Date of Patent: Sep. 24, 2013

(54) CARBON NANOTUBE BASED PASTES

(75) Inventors: Caihong Xing, Beijing (CN); Jianfeng Wang, Beijing (CN); Zhaojie Wei, Beijing (CN); Jun Ma, Irvine, CA (US); Ching-Jung Tsai, Beijing (CN); Qi Li, Marlborough, MA (US)

(73) Assignee: Cnano Technology Limited, San Francisco, CA (US)

( * ) Notice: Subject to any disclaimer, the term of this patent is extended or adjusted under 35 U.S.C. 154(b) by 318 days.

(21) Appl. No.: 13/006,266

(22) Filed: Jan. 13, 2011

(65) Prior Publication Data

US 2011/0171364 A1 Jul. 14, 2011

Related U.S. Application Data

(60) Provisional application No. 61/294,537, filed on Jan. 13, 2010.

(51) Int. Cl.
*H01B 1/06* (2006.01)
*B05D 5/12* (2006.01)

(52) U.S. Cl.
USPC .............................. 252/511; 427/77; 977/752

(58) Field of Classification Search
USPC .......... 252/500–521.6, 511; 427/77; 977/752
See application file for complete search history.

(56) References Cited

U.S. PATENT DOCUMENTS

| | | | |
|---|---|---|---|
| 4,427,820 A | 1/1984 | Backhouse | |
| 5,098,771 A | 3/1992 | Friend | |
| 6,528,211 B1 | 3/2003 | Nishimura | |
| 6,703,163 B2 | 3/2004 | Ogura | |
| 7,008,563 B2 | 3/2006 | Smalley | |
| 7,029,794 B2 | 4/2006 | Ogura | |
| 7,365,100 B2 | 4/2008 | Kuper | |
| 7,563,427 B2 | 7/2009 | Wei | |
| 7,608,362 B2 | 10/2009 | Choi | |
| 7,682,590 B2 | 3/2010 | Sakakibara | |
| 7,682,750 B2 | 3/2010 | Chen | |
| 7,781,103 B2 | 8/2010 | Sheem | |
| 8,257,677 B2 * | 9/2012 | Berkei et al. | 423/445 B |
| 2004/0038251 A1 | 2/2004 | Smalley | |
| 2006/0274047 A1 * | 12/2006 | Spath et al. | 345/173 |
| 2007/0224106 A1 | 9/2007 | Sakakibara | |
| 2008/0038635 A1 | 2/2008 | Sheem | |
| 2009/0208708 A1 | 8/2009 | Wei | |
| 2009/0286675 A1 | 11/2009 | Wei | |
| 2010/0021819 A1 | 1/2010 | Zhamu | |
| 2010/0143798 A1 | 6/2010 | Zhamu | |
| 2010/0176337 A1 | 7/2010 | Zhamu | |
| 2010/0261029 A1 * | 10/2010 | Borysenko et al. | 428/562 |
| 2010/0273050 A1 | 10/2010 | Sheem | |
| 2010/0311872 A1 * | 12/2010 | Lai et al. | 523/468 |
| 2011/0127472 A1 * | 6/2011 | Sato et al. | 252/511 |

OTHER PUBLICATIONS

Zhao, Bin, et al.; Synthesis and Properties of a water-soluble single-walled caron nanotube-Poly(m-aminobenzene sulfonic acid) graft copolymer; Adv.Funct. Mater. 2004, 14, No. 1, Jan. 1971.

(Continued)

*Primary Examiner* — Mark Kopec
*Assistant Examiner* — Jaison Thomas
(74) *Attorney, Agent, or Firm* — Fernandez & Associates, LLP

(57) ABSTRACT

Carbon-nanotube based pastes and methods for making and using the same are disclosed. Carbon nanotubes are dispersed via milling; resultant paste has Hegman scale of greater than 7. The pastes can be used as electro-conductivity enhancement in electronic devices such as batteries, capacitors, electrodes or other devices needing high conductivity paste.

3 Claims, 6 Drawing Sheets

(56) References Cited

OTHER PUBLICATIONS

Li, Yadong, et al.; "Bismuth Nanotubes: A Rational low-temperature Synthetic Route"; J.Am.Chem.Soc.; 2001, 123, 9904.

Li, Lain-Jong, et al.; "Comparative study of photoluminescence of single-walled carbon nanotubes wrapped with sodium dodecyl sulfate, surfactin and polyvinylpyrrolidone"; Instit.of Physics Publishing, nanotechnology; 16, (2005) S202.

Zhang, Xiefei, et al.; "Poly(vinyl alcohol)/SWNT Composite Film"; Nano Letters 2003 vol. 3, 9, 1285.

Li, Lain-Jong, et al.; "Chirality Assignment of single-walled carbon nanotubes with strain"; Phys.Rev. Letters, 93, 5, Oct. 2004, 156104-1.

Kim, Woon-Soo, et al.; "Electrical Properties of PVdF/PVP Composite filled with carbon nanotubes prepared by floating catalyst method"; Macromolecular Research, 10, 5, 253, (2002).

Sheem, K. Y., et al.; "High-density positive electrodes containing carbon nanotubes for use in Li-ion cells"; Jl. Power Sources 158, (2006) 1425.

Sheem, K. Y., et al.; "Electrostatic heterocaoagulation of carbon nanotubes an LiCoO2 particles for a high-performance Li-ion cell"; Electrochimica Acta 55, (2010) 5808.

Liu, X.M., et al.; "Sol-gel synthesis of multiwalled carbon nanotube-LiMn2O4 nanocomposites as cathode materials for Li-ion batteries"; Jl. Power Sources 195, (2010) 4290.

Hill, John; "How to uniformly disperse nanoparticles in battery cathode coating"; Advanced Materials & Processes, May 2010; 26.

Chen, N.;"Surface phase morphology and composition of the casting films of PVDF-PVP blend"; Polymer, 43, 1429 (2002).

* cited by examiner

CARBON NANOTUBE BASED PASTES

PRIORITY

This application claims priority from Provisional Application 61/294,537 filed on Jan. 13, 2010 and incorporated herein in its entirety by reference.

CROSS-REFERENCE TO RELATED APPLICATIONS

This application is related to U.S. Pat. No. 7,563,427, U.S. Applications 2009/0208708, 2009/0286675, U.S. Ser. No. 12/516,166 and U.S. application Ser. No. 13/006,321 filed on Jan. 13, 2011 entitled Enhanced Electrode Composition for Li ion Battery; all incorporated herein in their entirety by reference.

BACKGROUND OF THE INVENTION

Field of the Invention

The present disclosure relates to carbon nanotube-based pastes and methods of making such. Moreover, this paste may be applied as an electro-conductive additive in battery, capacitor, and other electronic devices.

Carbon nanotubes (CNT) have many unique properties stemming from small sizes, cylindrical graphitic structure, and high aspect ratios. A single-walled carbon nanotube (SWCNT) consists of a single graphite sheet wrapped around to form a cylindrical tube. A multiwall carbon nanotube (MWCNT) includes a set of concentrically single layered nanotube placed along the fiber axis with interstitial distance of 0.34 nanometer. Carbon nanotubes have extremely high tensile strength (~150 GPa), high modulus (~1 TPa), good chemical and environmental stability, and high thermal and electrical conductivity. Carbon nanotubes have found many applications, including the preparation of conductive, electromagnetic and microwave absorbing and high-strength composites, fibers, sensors, field emission displays, inks, energy storage and energy conversion devices, radiation sources and nanometer-sized semiconductor devices, probes, and interconnects, etc.

Carbon nanotubes possess outstanding materials properties but they are difficult to process and insoluble in most solvents. Historically polymers such as poly(vinylpyrrolidone) (PVP), poly(styrene sulfonate) (PSS), poly(phenylacetylene) (PAA), poly(meta-phenylenevinylene) (PmPV), polypyrrole (PPy), poly(p-phenylene benzobisoxazole) (PBO) and natural polymers have been used to wrap carbon nanotubes and render them soluble in water or organic solvents. Previous work also reports single-walled carbon nanotubes (SWCNTs) have been dispersed with three types of amphiphilic materials in aqueous solutions: (i) an anionic aliphatic surfactant, sodium dodecyl sulfate (SDS), (ii) a cyclic lipopeptide biosurfactant, surfactin, and (iii) a water-soluble polymer, polyvinylpyrrolidone (PVP).

Known electro-conductive pastes or inks are comprised primarily of polymeric binders which contain or have mixed in a lesser amount of electro-conductive filler such as finely divided particles of metal such as silver, gold, copper, nickel, palladium or platinum and/or carbonaceous materials like carbon black or graphite, and a liquid vehicle. A polymeric binder may attach the conductive filler to a substrate and/or hold the electro-conductive filler in a conductive pattern which serves as a conductive circuit. The liquid vehicle includes solvents (e.g., liquids which dissolve the solid components) as well as non-solvents (e.g., liquids which do not dissolve the solid components). The liquid vehicle serves as a carrier to help apply or deposit the polymeric binder and electro-conductive filler onto certain substrates. An electro-conductive paste with carbon nanotubes dispersed within is a versatile material wherein carbon nanotubes form low resistance conductive networks.

In one embodiment, an electro-conductive paste is in a liquid form; for example, a polymeric binder is a liquid at room temperature and a electro-conductive filler is dispersed therein. Such electro-conductive pastes are described in U.S. Pat. No. 5,098,771 to Friend entitled "Conductive Coatings and Inks"; incorporated herein in its entirety by reference. Friend describes a composite suitable for application to a surface comprising polymeric binder and between about 30 and 0.5 percent carbon nanotubes. The coatings made by the conductive inks of Friend have bulk resistivity between $10^{-2}$ and $10^6$ ohm-cm, and preferably between $10^{-1}$ and $10^4$ ohm-cm. Binder choices include polyethylene, polypropylene, polyamide, polyurethane, polyvinyl chloride, polyvinyl fluoride and thermoplastic polyester resins.

Zhang [4] and co-workers reported using poly(vinyl alcohol), PVA, composite films using poly(vinyl pyrrolidone, PVP, and sodium dodecyl sulfate, SDS, covered, well dispersed single wall carbon nanotubes, SWNT, to achieve significant improvement in tensile strength and modulus as compared to the control PVA and PVA/PVP/SDS films without SWNT in 2003. Dispersing carbon nanotubes can also be assisted with a surfactant as described by Sakakibara and co-workers in US Patent Application No. 2007/0224106, now U.S. Pat. No. 7,682,590; both incorporated herein in their entirety by reference; Sakakibara discloses single-walled carbon nanotubes are dispersed in polyvinylpyrrolidone dissolved in n-methylpyrrolidone with the presence of polyoxyethylene surfactant.

In 2004 Li [5] and co-workers reported on the chirality of single-walled nanotubes using "polymer wrapping" with polyvinylpyrrolidone to isolate the SWNT for measurement purposes. In 2002 Kim [6] and co-workers reported using multi-walled carbon nanotubes, MWNT, as the conductive filler in a binary polymer matrix composed of poly(vinylidene fluoride) (PVdF), and poly(vinyl pyrrolidone) (PVP) for EMI shielding applications.

Conventional electro-conductive pastes or inks normally contain significantly greater amounts of polymeric binders than electro-conductive fillers. It was believed that the polymeric binder acted like glue and thus was essential in electro-conductive coatings to keep the electro-conductive fillers in place or to attach them to the substrate, as well as in electro-conductive inks to prevent the ink from running or bleeding. Thus, commercial carbon inks and coatings typically contain a greater weight percentage of polymeric binders than the electro-conductive filler. The larger presence of polymeric binder, however, limits the overall conductivity of the electro-conductive ink or coating. Moreover, for specific applications such as Lithium-ion batteries, excessive amounts of polymers or fillers are not desired as they reduce the usage of active electrode materials and thus decrease overall capacity. During investigation, it was surprisingly found that selected liquid vehicles in various combinations can further reduce binder loading requirements. In some embodiments it is possible that PVP and PVDF may undergo strong interaction as shown by N. Chen in "Surface phase morphology and composition of the casting films of PVDF-PVP blend", Polymer, 43, 1429 (2002). The addition of PVP altered the crystallisation of PVDF and hence modified its mechanical and adhesion properties. The decreased of PVDF or combined PVP- PVDF can further improve the battery performance by allowing more addition of cathode material, so that improve the total capacity.

The inventors have discovered, however, that the amount of polymeric binder needed in electro-conductive pastes can be eliminated or significantly reduced when using multiwall carbon nanotubes of the present invention as an electro-conductive filler and various polymers, for example, polyvinylpyrrolidone (PVP), as dispersant. As a result, the inventors have discovered that conductivity of electro-conductive pastes can be significantly improved.

BRIEF SUMMARY OF THE INVENTION

It is an object of this invention to provide an electro-conductive, multi-walled carbon nanotube-based paste with improved solid state conductivity between about $10^{-1}$ Ω-cm and $10^{-4}$ Ω-cm. It is yet another and related object of this invention to provide an electro-conductive carbon nanotube-based pastes with improved conductivity, and that incorporates less carbon filler material by weight and, optionally, has a tap density≥0.03 g/cm$^3$; optionally a viscosity in use of ≥5,000 cps; optionally, a viscosity in use of ≥1,000 cps; optionally, a binder loading between about 0.2-5% by weight of the paste composition; optionally, a MWNT loading between about 1 and 15% by weight; optionally, a Hegman scale number greater than 7. It is a related object of this invention to provide an electro-conductive carbon nanotube-based paste that has greater conductivity and that incorporates less polymeric component by weight than conventional pastes.

It is yet another object of this invention to provide an electro-conductive carbon nanotube-based paste that incorporates less carbon filler material and polymeric component while polymeric content is further less than the carbon content. It is yet another objective of this invention to provide a concentrated electro-conductive carbon nanotube-based pastes that can be further diluted with more solvent during applications by a user. It is still a further and related object of this invention to provide a method for making an electro-conductive carbon nanotube-based paste. It is a further object of this invention to improve electro-conductivity of electrode materials in a lithium-ion battery.

The present invention provides an electro-conductive paste, in one embodiment, comprising multi-wall carbon nanotubes, polyvinylpyrrolidone and a solvent. There are at least two surprising advantages of using multi-wall carbon nanotube-based pastes. First, multi-wall carbon nanotubes provide a means to create superior electro-conductive network in liquid form. Second, multi-wall carbon nanotubes provide a convenient means to pattern carbon nanotubes on a substrate or within the interstitial space of particulates when the properties of nanotubes are to be exploited.

Thus, the present invention relates to electro-conductive pastes that contain multi-wall carbon nanotubes. Preferably, the electro-conductive paste comprises dispersed carbon nanotubes and a liquid vehicle in which the size of solid particulates or agglomerates is less than 10 micrometers in at least one dimension.

In another embodiment, electro-conductive pastes of the present invention further comprise a polymeric dispersant. The polymeric dispersant is present in an amount less than that of carbon nanotubes by weight. One exemplary dispersant is polyvinylpyrrolidone; polyvinylpyrrolidone provides sufficient bonding between CNT's and a liquid vehicle to stabilise the dispersed nanotubes; no additional binder is required, in some embodiments.

The present invention also provides a method of making concentrate pastes, which may serve as a "masterbatch" comprising more nanotube filler content than required for some applications. When a master batch is diluted with additional liquid or solid, a concentration of nanotubes therein can be adjusted down to a desired level for final applications; for example, use as electro-conductive additive in lithium ion battery electrodes.

Other improvements which the present invention provides over prior art will be identified as a result of the following description which sets forth preferred embodiments of the present invention. The description is not intended to limit the scope of the present invention, but rather to provide working examples of various embodiments.

DETAILED DESCRIPTION OF THE INVENTION

Definitions

Figure 6:
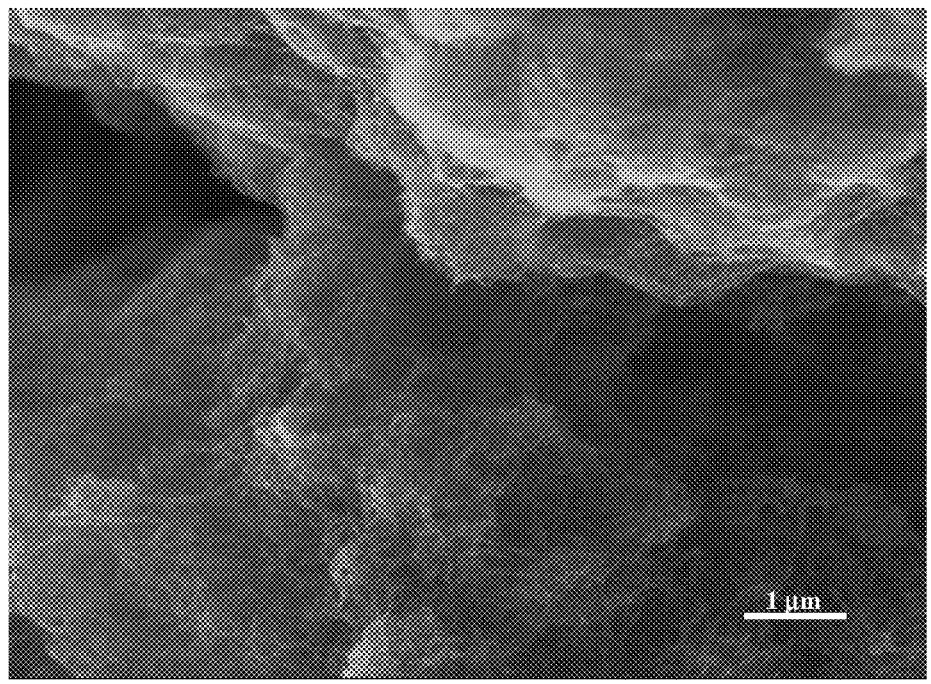
FIG. 6 shows spherical agglomerates of carbon nanotube made in a fluidized bed reactor.

FIGS. 6a, b and c of U.S. 2009/0286675 show spherical agglomerates of carbon nanotube made in a fluidized bed reactor with distinctive properties critical to the instant invention. FIG. 6a are carbon nanotube agglomerates with an average diameter of about 100 microns. FIG. 6b shows that the large spherical agglomerates are actually a composite agglomerate with hundreds of nano agglomerate in an adhesion formation. FIG. 6c shows the entanglement of interwoven carbon nanotubes within the nano-sized agglomerates. FIG. 6 of the instant invention is another view of agglomerates as required by the instant invention. The carbon nanotubes are in the form of agglomerates; most of the agglomerates are near spherical in shape with diameters of less than 100 microns. In FIG. 6a the carbon nanotube agglomerates are the roughly spherical particles with an average diameter of about 100 microns. The density of the agglomerates is from 0.050 to 0.200 g/cm$^3$. The carbon nanotubes produced using a fluidized bed with the carbon nanotube agglomerates are highly crystalline, having a purity of greater than 96%. Forming nano-agglomerates is a critical step for growth of carbon nanotubes in a fluidized-bed reactor. Nano-agglomerates are defined as agglomerates with a dimension of 1-1000 microns composed of nano-scale materials in an aggregated structure. The catalyst agglomerates are not only effecting the catalytic growth but also impacting the microstructure and morphology of the final carbon nanotube agglomerates with diameters of 4-100 nm, and length of 0.5 to 1000 micron. The aggregation strength of the composite agglomerates is not very high.

For purposes herein, aggregation of small agglomerates is called a "simple agglomerate", and re-aggregation of simple agglomerates together to form large aggregates is called "composite agglomerate" or "complex agglomerate". The average volume diameter of simple agglomerates is on the order of microns while that of composite agglomerate is on order of the tens of microns. High-magnification scanning electron microscope shows that the agglomerates are rich in carbon nanotubes, similar to fluffy cotton. Formation of loose agglomerate structure is unique and unexpected, requiring specific conditions; not all nano-material processes form a loose agglomerate structure. Formation of loose agglomerate structure is unique to the cited prior art of the assignee. The fluidized bed reaction is under a dense phase fluidization and there is no deposit of amorphous carbons on the nanotubes. Carbon nanotubes and carbon nanotube agglomerates of various structures and morphologies can be prepared using the methods of the cited inventions. In some embodiments of the instant invention starting with spherical agglomerates is critical to attaining a paste composite composition with the desired properties.

The term "agglomerate" refers to microscopic particulate structures of carbon nanotubes; for example, an agglomerate is typically an entangled mass of nanotubes; a mass having dimensions between about 0.5 μm to about 5 mm as made.

The term "carbon nanotube" means a hollow carbon structure having a diameter from about 4 to about 100 nm; for purposes herein "carbon nanotube" means multi-walled nanotubes exhibiting little to no chirality.

The term "multi-wall carbon nanotube", MWNT, refers to carbon nanotubes wherein graphene layers form more than one concentric cylinder placed along the fiber axis.

The term "carbon nanotube-based paste" refers to an electro-conductive composite in which an electro-conductive filler is combined with multi-wall carbon nanotubes.

The term "composite" means a material comprising at least one polymer and at least one multi-wall carbon nanotube and/or agglomerate.

The term "dispersant" refers to an agent assisting dispersing and stabilising carbon nanotubes in a composite; a composite may be a suspension or paste or other mixture comprising nanotubes and one or more other materials; a suspension is also mixture comprising nanotubes and one or more other materials, typically a dispersant(s) and liquid vehicle(s).

Carbon Nanotubes

There are various kinds of carbon nanotube structures reported in the art, namely single-walled nanotube, multi-wall nanotube, vapor-phase grown carbon fibers, VGCF, etc. A distinct difference is the diameter of the nanotube; as reported in the literature, SWCNT has diameters between 0.4-2 nm; MWCNT between 4 to 100 nm; VGCF is greater than 100 nm.

Preparation of carbon nanotubes have been documented extensively. Generally, a catalyst is used in a heated reactor under carbonaceous reagents. At elevated temperatures, the catalyst will decompose carbon precursors and the generated carbon species will precipitate in the form of nanotubes on catalyst particles. A continuous mass production of carbon nanotubes agglomerates can be achieved using a fluidized bed, mixed gases of hydrogen, nitrogen and hydrocarbon at a low space velocity as described in U.S. Pat. No. 7,563,427.

Carbon Nanotube Agglomerates

As-made, carbon nanotubes often form entanglements, also known as agglomerates. U.S. Pat. No. 7,563,427; hereby incorporated herein in its entirety by reference, describes such agglomerates comprising a plurality of transition metal nanoparticles and solid supports, wherein a plurality of metal nanoparticles and supports are combined to form a plurality of catalyst nano-agglomerates; a plurality of multi-walled carbon nanotubes deposited on a plurality of catalyst nano-agglomerates. The agglomerates have sizes from about 0.5 to 10,000 micrometers, wherein carbon nanotubes are in the form of multiwall nanotubes having diameters of about 4 to 100 nm. The size of as-made agglomerates can be reduced by various means. A representative characteristic of these agglomerates is their tap density; the tap density of as-made agglomerates can vary from 0.02 to 0.20 $g/cm^3$ depending upon catalyst, growth condition, process design, and other factors. Rigid agglomerates tend to have high tap densities, while fluffy ones and single-walled nanotubes have low tap densities.

Dispersant

Dispersant serves as an aid for dispersing carbon nanotubes in a solvent. It can be a polar polymeric compound, a surfactant, or high viscosity liquid such as mineral oil or wax. Dispersants used in the current invention include poly(vinylpyrrolidone) (PVP), poly(styrene sulfonate) (PSS), poly (phenylacetylene) (PAA), poly(meta-phenylenevinylene) (PmPV), polypyrrole (PPy), poly(p-phenylene benzobisoxazole) (PBO), natural polymers, amphiphilic materials in aqueous solutions, anionic aliphatic surfactant, sodium dodecyl sulfate (SDS), cyclic lipopeptide bio surfactant, surfactin, water-soluble polymers, poly(vinyl alcohol), PVA, sodium dodecyl sulfate (SDS), polyoxyethylene surfactant, poly(vinylidene fluoride) (PVdF), carboxyl methyl cellulose (CMC), hydroxyl ethyl cellulose (HEC), polyacrylic acid (PAA), polyvinyl chloride (PVC) and combinations thereof. Polymeric binder choices include the dispersants mentioned as well as polyethylene, polypropylene, polyamide, polyurethane, polyvinyl chloride, polyvinylidene fluoride, thermoplastic polyester resin and combinations thereof.

Polyvinylpyrrolidone, PVP, binds polar molecules extremely well. Depending upon its molecular weight, PVP has different properties when used as a binder or as a dispersing agent such as a thickener; as used herein a thickener may be a viscous polymer, a binder or dispersant. In some embodiments of the instant invention, molecular weights for dispersants and/or binders range between about 9,000 and 1,800,000 Daltons; in some embodiments, between about 50,000 to 1,400,000 Daltons are preferred; in some embodiments between about 55,000 to 80,000 Daltons are preferred.

Liquid Vehicle

A liquid vehicle, aqueous or non-aqueous, may serve as a carrier for carbon nanotubes. Liquid vehicles may be a solvent or a non-solvent, depending upon whether or not a vehicle dissolves solids which are mixed therein. The volatility of a liquid vehicle should not be so high that it vaporizes readily at relatively low temperatures and pressures such as room temperature and pressure, for instance, 25° C. and 1 atm. The volatility, however, should not be so low that a solvent does not vaporize somewhat during paste preparation.

In one embodiment, a liquid vehicle is used to dissolve polymeric dispersant(s) and entrain carbon nanotubes in order to render a composition that is easily applied to a substrate. Examples of liquid vehicles include, but are not limited to, water, alcohols, ethers, aromatic hydrocarbons, esters, ketones, n-methyl pyrrolidone and mixtures thereof.

In some cases, water is used as a solvent to dissolve polymers and form liquid vehicles. When combined with specific polymers these aqueous systems can replace solvent based inks while maintaining designated thixotropic properties, as disclosed in U.S. Pat. No. 4,427,820, incorporated herein in its entirety by reference.

Nanotube Dispersion

Dispersing carbon nanotubes in a liquid is difficult because of the entanglement of nanotubes into large agglomerates. In some embodiments one means of reducing the size of large agglomerates to acceptable size agglomerates is to apply a shear force to an agglomerate; a shear force is one technique to aid with dispersion. Means to apply a shear force include, but are not limited to, milling, sand milling, sonication, grinding, cavitation, or others known to one knowledgeable in the art. In one embodiment, carbon nanotubes are first reduced in size by using a jet-miller. The tap density can decrease after dispersion, optionally by milling, to around 0.06 $g/cm^3$ in some embodiments, or 0.04 $g/cm^3$ in some embodiments, or 0.02 $g/cm^3$ in some embodiments. In some embodiments a colloid mill or sand mill or other technique, is then used to provide sufficient shear force to further break up nanotube agglomerates, as required by an application.

Extent of Dispersion

Once dispersed, the size of nanotube agglomerates is decreased as nanotubes are freed from entanglements, entering a liquid vehicle as individualized nanotubes or agglomerates of size less than 10 micrometers, preferably less than 5 micrometers and more preferably less than 1 micrometers in one dimension. The fineness of remaining agglomerates can be measured using a Hegman gauge as indicated by "Hegman scale". A Hegman Fineness-of-Grind Gage is a flat steel block in the surface of which are two flat-bottomed grooves varying uniformly in depth from a maximum at one end of the block to zero near the other end. Groove depth is graduated on the block according to one or more scales used for measuring particle size. The degree of dispersion is indicated in microns or "Hegman". The Hegman scale or National Standard scale may be abbreviated "NS"; the scale ranges from 0 to 8 with numbers increasing as the particle size decreases.

0 Hegman=4 mil/100 micron particle size
4 Hegman=2 mil/50 micron particle size
8 Hegman=0 mil/0 micron particle size For purposes of the disclosed invention we define a Hegman reading of 7 or greater as being indicative of a MWNT agglomerate size of less than 10 microns in one dimension. As dispersed and reduced in size by milling, a MWNT agglomerate size is less than 10 microns; optionally less than 5 microns; optionally less than one micron. Dispersed nanotubes are known in the art to increase the viscosity of a medium therein. Thus viscosity measurement can also serve as a barometer of possible dispersion limit as the paste viscosity reaches a maximum. For purposes of the disclosed invention we disclose that a paste viscosity 5,000 cps or greater is preferred depending upon the application.

Condensed Paste

In one embodiment, carbon nanotube paste can be treated via centrifugation to remove excessive liquid vehicle while preventing nanotubes re-agglomerating into large particles. Alternative methods include but are not limited to vacuum filtration, pressurized filtration, or combinations thereof. The extracted solvent can be recycled and reused as liquid vehicle. The nanotube content in the condensed paste in one embodiment is 1-20%, in one embodiment 2-15%, and in one embodiment 5-10% by weight.

Carbon Nanotube Paste Preparation

In one embodiment an electro-conductive paste comprising a dispersant, carbon nanotubes and liquid vehicle, a solution is first formed by blending a dispersant with a liquid vehicle until the dispersant is uniformly mixed in the vehicle. Any conventional means of mixing or agitation known in the art can be used, for example, a blender, mixer, stir bar, or other means.

In one embodiment as-made carbon nanotube agglomerates are reduced in size with a jet miller or other means of size reduction as previously listed. Ground nanotubes of the desired concentration are then added and/or mixed with the solution. The carbon nanotubes can optionally be added via another liquid carrier. On the other hand, if no polymeric binder is used to form the electro-conductive paste, then carbon nanotubes can be added initially to a liquid vehicle and mixed therein.

In one embodiment, carbon nanotubes are dispersed uniformly in a solution using one or more uniform dispersion means; exemplary dispersion means are jet mill, sonicator, ultrasonics, colloid-mill, ball-mill, bead-mill, sand-mill, and roll-mill. For example, a colloid mill can be used at a high enough power setting to ensure uniform dispersion. The milling generates shear forces that make carbon nanotube particles more uniform and smaller resulting in increased homogeneity. Milling may continue until gel-like slurry of uniformly dispersed nanotubes is obtained. Optionally, wet milling can be performed (i) in a mixture with the liquid vehicle with, or without, the polymer binder, or (ii) at a dilute level in the liquid vehicle with subsequent concentration and drying. Dispersion is not very effective at carbon nanotube concentrations higher than 5% by weight because high viscosity prevents convection and mixing; lower concentrations of nanotubes result in greater dispersion.

Optionally, a paste is condensed by removing excess liquid with, for example, a centrifuge; centrifugation causes dispersed material to become more concentrated. A final dispersed state is affected by a final concentration, additional milling processes and dispersant and/or liquid content. A liquid vehicle can be recycled or reused to make additional paste.

One method to formulate a carbon nanotube-based conductive paste comprises the steps: selecting an as-grown, multi-walled carbon nanotube; optionally, reducing the size of the as-grown, multi-walled carbon nanotube agglomerates by dry milling; mixing with a dispersant with a liquid vehicle; optionally, reducing the size of the as-grown, multi-walled carbon nanotube agglomerates by wet milling; mixing the size reduced carbon nanotubes with the mixed dispersant and liquid vehicle followed, optionally, by high shear milling particles and/or agglomerates remaining in the said paste to achieve a Hegman scale of 7 or higher; and, optionally, removing a predetermined portion of the liquid vehicle by centrifuge or other drying means to achieve a viscosity of greater than 5000 cps.

Figure 1:
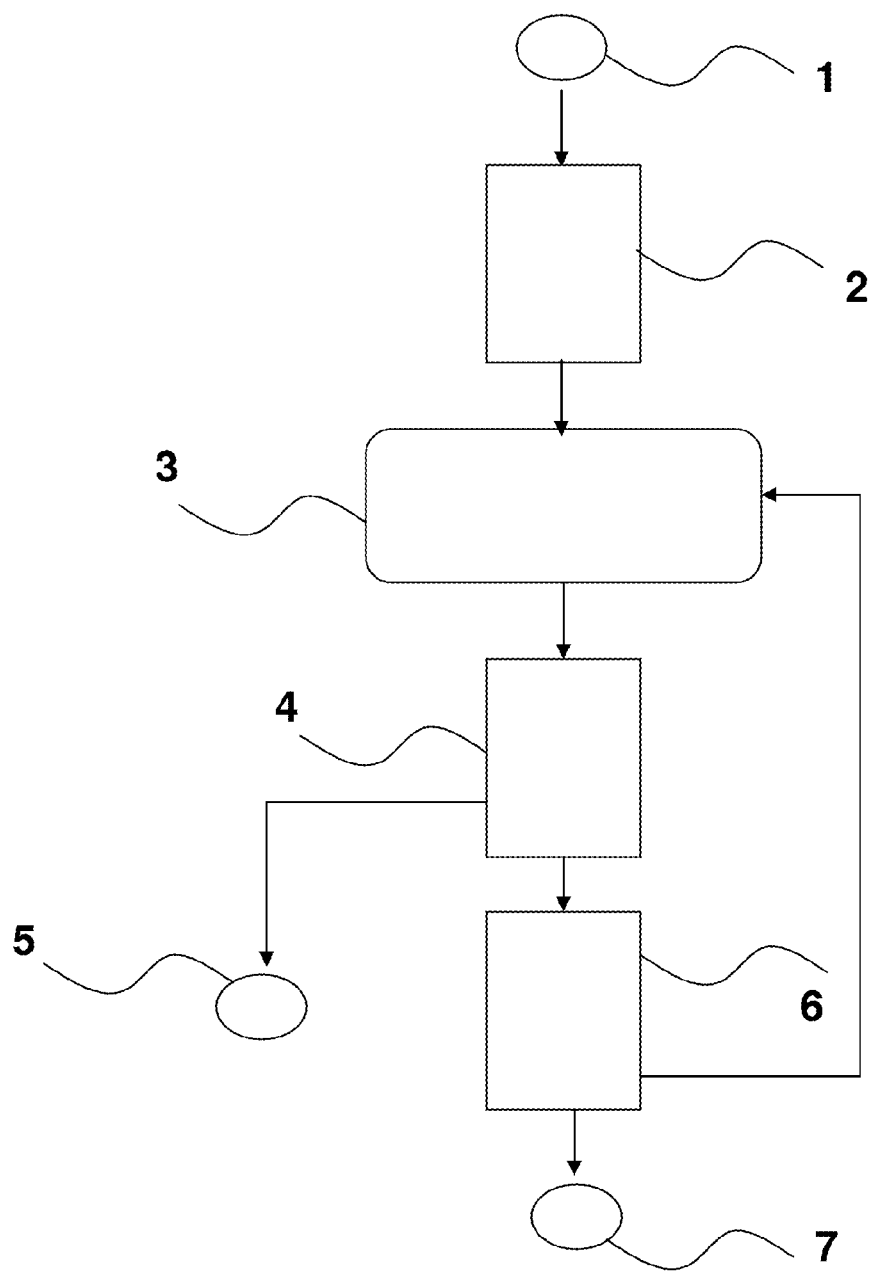
FIG. 1 illustrates a process of making carbon nanotube-based electro-conductive paste.

FIG. 1 illustrates an exemplary process of making carbon nanotube-based conductive paste. A starting material "1" is as-made carbon nanotube agglomerates. After size reduction in a jet-miller "2", the ground nanotubes are mixed with dispersant and liquid vehicle in a vessel "3". The mixture then passes through a colloid mill "4" for a predetermined amount of time before becoming a conductive paste "5". Further condensation in a centrifuge "6" forms preferred formulations with concentrated nanotube content "7". Excessive amounts of solvent and dispersant are sent back to "3" for reuse.

Battery Composition

Lithium-ion batteries (sometimes abbreviated Li-ion batteries) are a type of rechargeable battery in which lithium ions move from the negative electrode (anode) to the positive electrode (cathode) during discharge, and from the cathode to the anode during charge. The three primary functional components of a lithium-ion battery are the anode, cathode, and electrolyte, for which a variety of materials may be used.

Commercially, the most popular material for the anode is graphite. The cathode is generally one of three materials: a layered oxide (such as lithium cobalt oxide), one based on a polyanion (such as lithium iron phosphate), or a spinel (such as lithium manganese oxide), although materials such as $TiS_2$ (titanium disulfide) originally were also used. Depending on the choice of material for the anode, cathode, and electrolyte, the voltage, capacity, life, and safety of a lithium-ion battery can change dramatically. In addition to the three main components, Li-ion batteries also contain polymeric binders, conductive additives, separator, and current collectors. Carbon black such as Super-P™ made by Timcal Corporation is usually used as conductive additives. The instant invention discloses the use of carbon nanotube-based conductive paste for both the cathode and the anode in a Lithium-ion battery. Once deposited inside the active materials, the carbon nanotubes create conductive networks within particulates, so as to enhance overall conductivity and reduce battery internal resistance. A modified battery can have improved capacity and cycle life owing to the conductive network built by carbon nanotubes.

EXAMPLES

Example 1

Figure 2:
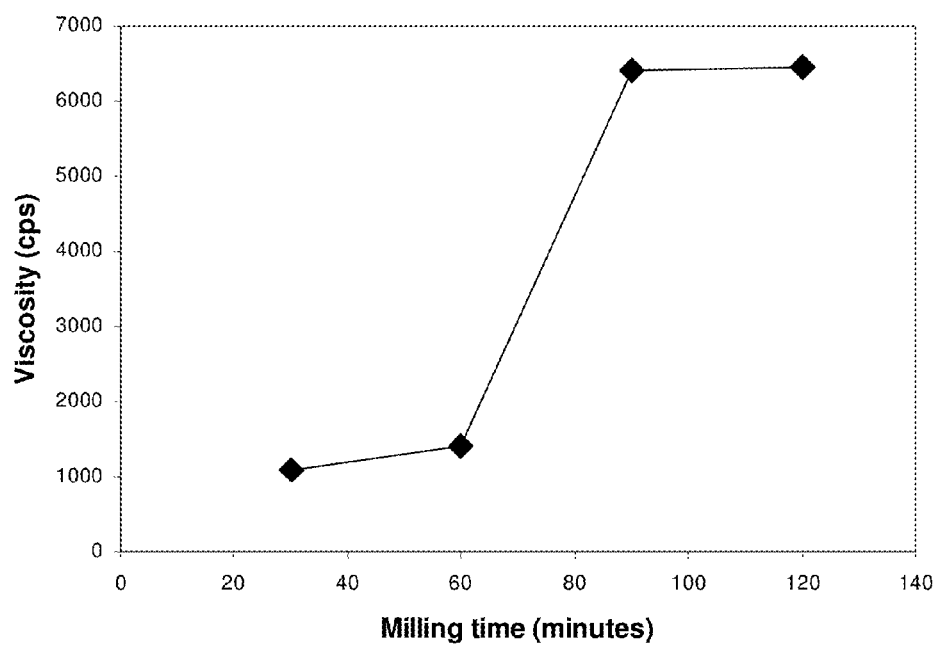
FIG. 2 shows the relationship of paste viscosity as a function of the duration of milling as described in Example 1.

Dispersion of Carbon Nanotubes in n-Methylpyrrolidone 30 grams of FloTube™ 9000 carbon nanotubes manufactured by CNano Technology Ltd., which have been pulverized by jet-milling, were placed in 2-liter beaker. The tap density of this material is 0.03 g/cm$^3$. In another 500 milliliter beaker, 6 grams of PVP k90 (manufactured by BASF) was dissolved in 100 grams of n-methylpyrrolidone. Then the PVP solution was transferred to the nanotubes together with 864 grams n-methylpyrrolidone. After being agitated for an hour, the mixture was transferred to a colloid mill and ground at a speed of 3000 RPM. A test sample was taken out every 30-minute for evaluation. Viscosity was taken at 25° C. using Brookfield viscometer for each sample and recorded in FIG. 2. Hegman scale reading was taken simultaneously and illustrated. Maximum dispersion was observed after milling for 90 minutes. The fineness of this pastes reached better than 10 micrometer after 60 minutes of milling.

Example 2

Effect of Dispersant Content on the Dispersion of Carbon Nanotubes

Figure 3:
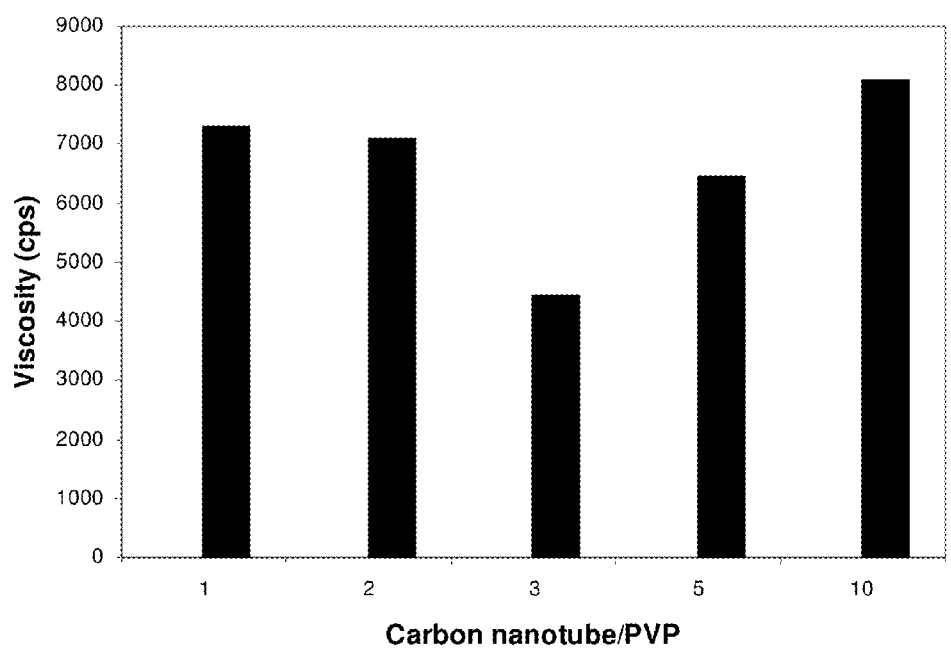
FIG. 3 illustrates the relationship of paste viscosity as a function of the ratio of carbon nanotube versus PVP as described in Example 2.

In several 2-liter beakers, 30 grams of pulverized carbon nanotubes were placed in each. In another 2-liter beaker, 100 grams of PVP k90 was dissolved in 1000 grams n-methylpyrrolidone. Various amounts of PVP solution were taken and added to the nanotubes to give the weight ratio of carbon nanotube to PVP of 1, 2, 3, 5, and 10 respectively. The final nanotube content of each mixture was adjusted to 3% with additional solvent. The same procedure was follow as illustrated in Example 1 and samples with various ratios of CNT/PVP were obtained after milled for various period of time to reach maximum dispersion. The final viscosity of each sample was measured and recorded in FIG. 3. It was discovered that a preferred ratio of carbon nanotubes to PVP was around 3, where both dispersion and ease of process reached optimum.

Example 3

Application of Carbon Nanotube Paste on Li-Ion Battery Cathode Material

Figure 4:
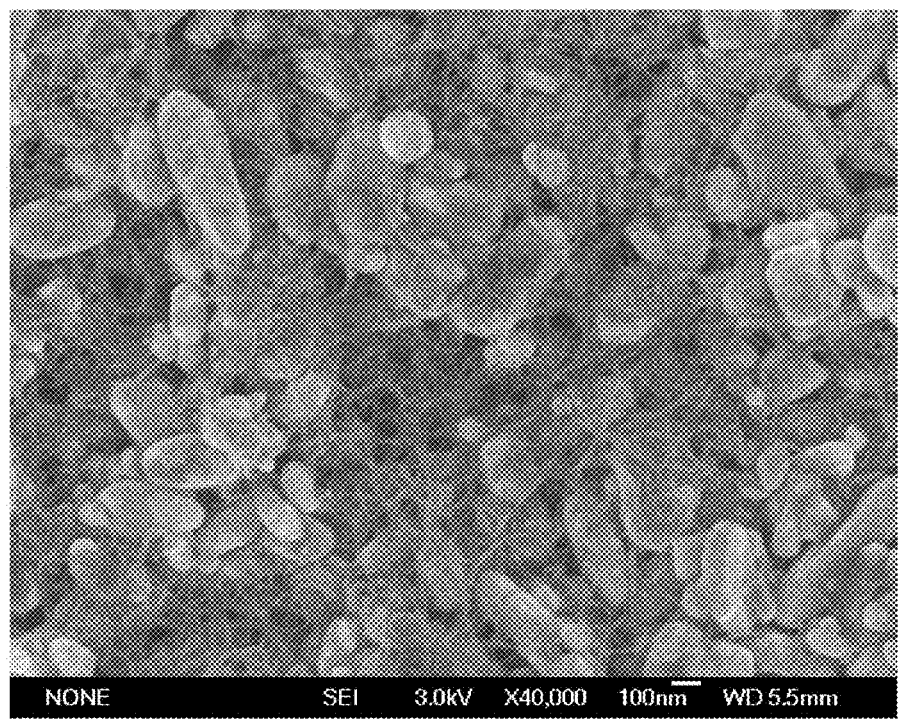
FIG. 4 shows the electron micrograph of dispersed carbon nanotubes within a Lithium iron phosphate particulate network.

A CNT paste comprising 2% CNT and 0.4% PVP k30 was selected to make a Lithium-ion coin battery. $LiFePO_4$, manufactured by Phostech/Sud Chemie was used as cathode material and Lithium foil was used as anode. The cathode materials containing $LiFePO_4$, CNT, PVP, and PVDF were prepared by mixing appropriate amounts of $LiFePO_4$, CNT paste and PVDF together with n-methylpyrrolidone in a Warren blender. Coating of such paste was made on an Al foil using a doctor blade followed by drying and compression. FIG. 4 showed a conductive network formed by CNT coating on $LiFePO_4$ observed under scanning electron microscope (SEM)

As a comparison, an electrode was prepared using Super-P carbon black (CB) to replace CNT in a similar fashion as described before. The composition and bulk resistivity of the two battery electrodes were summarized in the following table. Clearly, CNT-added electrode has much lower bulk resistivity than carbon black modified sample with the same concentration.

TABLE 1

Battery composition of CNT and carbon black modified lithium ion battery

| Content | CNT | Carbon Black |
|---|---|---|
| $LiFePO_4$ | 86.8% | 88% |
| Carbon additives | 2% | 2% |
| PVP | 0.4% | — |
| PVDF | 5% | 5% |
| Bulk resistivity (ohm · cm) | 3.1 | 31 |

Example 4

Performance of Nanotube-Modified Li-Ion Battery

Figure 5:
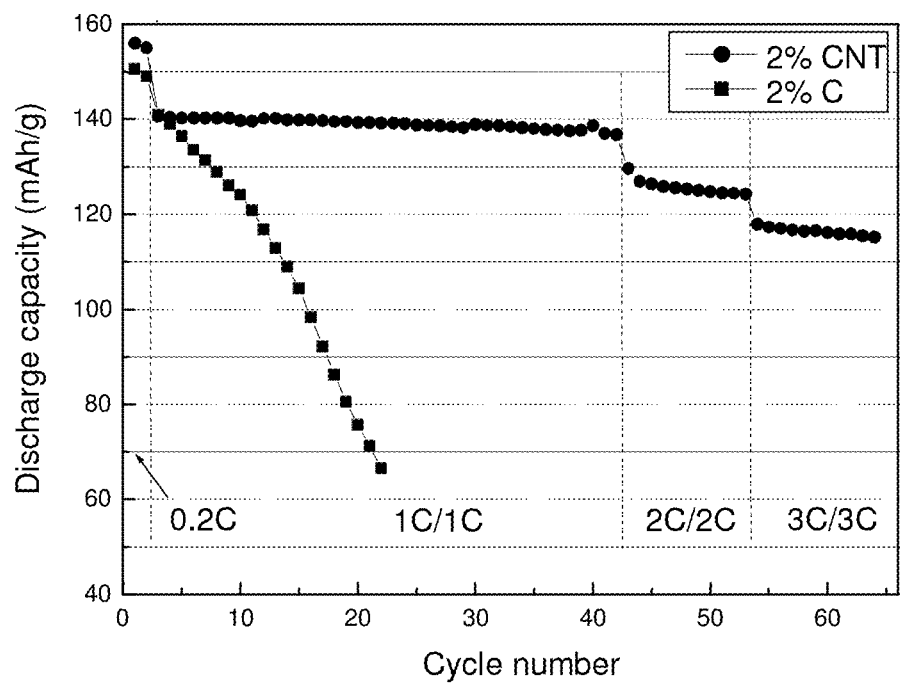
FIG. 5 shows the comparison of charge/discharge cycles at various charge speed from carbon nanotube and carbon black-decorated Lithium ion coin battery.

A coin battery was assembled using cathode composition defined in Example 5 and Lithium foil as anode. The capacity of cycle life was evaluated at 25° C. The charge and discharge cycles under different speed were illustrated in FIG. 5. The CNT-modified battery exhibited better performance in term of charge capacity and stability.

Example 5

Condensation of Nanotube Paste

Samples made in Example 1 were subject to centrifuge to extract excessive amount of solvent and the CNT content can reach 5, 10 and 15%. The condensed can be re-diluted with additional n-methylpyrrolidone under high-speed agitation. Battery with the same CNT loading made from such paste was made using procedure described in Example 3, and evaluated following the same procedure as shown in Example 4. There was no significant difference in battery performance among various batteries.

As indicated above, a highly conductive CNT paste can be prepared using very small amounts of PVP and no other binders. Using such paste in a Lithium ion battery can greatly improve the battery performance.

Exemplary lithium ion battery materials comprise lithium based compounds and or mixtures comprising lithium and one or more elements chosen from a list consisting of oxygen, phosphorous, sulphur, nitrogen, nickel, cobalt, manganese, vanadium, silicon, carbon, aluminum, niobium and zirconium and iron. Typical cathode materials include lithium-metal oxides, such as $LiCoO_2$, $LiMn_2O_4$, and $Li(Ni_xMn_yCo_zO_2)$, vanadium oxides, olivines, such as $LiFePO_4$, and rechargeable lithium oxides. Layered oxides containing cobalt and nickel are materials for lithium-ion batteries also.

Exemplary anode materials are lithium, carbon, graphite, lithium-alloying materials, intermetallics, and silicon and silicon based compounds such as silicon dioxide. Carbonaceous anodes comprising silicon and lithium are utilised anodic materials also. Methods of coating battery materials in combination with a carbon nanotube agglomerate onto anodic or cathodic backing plates such as aluminum or copper, for example, are disclosed as an alternative embodiment of the instant invention.

Prior art in this topic includes disclosures by Goodenough and Arumugam Manthiram of the University of Texas at Austin showing that cathodes containing polyanions, e.g. sulfates, produce higher voltages than oxides due to the inductive effect of the polyanion. In 1996, Goodenough, Akshaya Padhi and coworkers identified lithium iron phosphate ($LiFePO_4$) and other phospho-olivines (lithium metal phosphates with olivine structure) as cathode materials. In 2002, Yet-Ming Chiang at MIT showed a substantial improvement in the performance of lithium batteries by boosting the material's conductivity by doping it with aluminum, niobium and zirconium. The exact mechanism causing the increase became the subject of a debate. In 2004, Chiang again increased performance by utilising iron-phosphate particles of less than 100 nanometers in diameter. This decreased particle density by almost one hundredfold, increased the cathode's surface area and improved capacity and performance.

In some embodiments a paste composition comprises carbon nanotube agglomerates; a dispersant; and a liquid vehicle; wherein the carbon nanotube agglomerates are dispersed as defined by a Hegman scale reading of 7 or more; optionally, the carbon nanotubes are multiwall carbon nanotubes; optionally carbon nanotubes are in a spherical agglomerates; optionally, a paste composition comprises a dispersant selected from a group consisting of poly(vinylpyrrolidone) (PVP), poly(styrene sulfonate) (PSS), poly(phenylacetylene) (PAA), poly(meta-phenylenevinylene) (PmPV), polypyrrole (PPy), poly(p-phenylene benzobisoxazole) (PBO), natural polymers, amphiphilic materials in aqueous solutions, anionic aliphatic surfactant, sodium dodecyl sulfate (SDS), cyclic lipopeptide biosurfactant, surfactin, water-soluble polymers, carboxyl methyl cellulose, hydroxyl ethyl cellulose, poly(vinyl alcohol), PVA, sodium dodecyl sulfate, SDS, polyoxyethylene surfactant, poly(vinylidene fluoride), PVdF, carboxyl methyl cellulose (CMC), hydroxyl ethyl cellulose (HEC), polyacrylic acid (PAA), polyvinyl chloride (PVC) and combinations thereof; optionally the dispersant is poly (vinylpyrrolidone); optionally, a paste composition comprises a liquid vehicle selected from a group consisting of water, alcohols, ethers, aromatic hydrocarbons, esters, ketones, n-methyl pyrrolidone and mixtures thereof; optionally, a paste composition has a solid state bulk electrical resistivity less than $10^{-1}$ $\Omega$-cm and a viscosity greater than 5,000 cps; optionally, a paste composition comprises carbon nanotube agglomerates having a maximum dimension from about 0.5 to about 1000 micrometers; optionally, a paste composition has carbon nanotubes with a diameter from about 4 to about 100 nm; optionally, a paste composition comprises carbon nanotube agglomerates made in a fluidized bed reactor; optionally, a paste composition comprises carbon nanotube agglomerates have been reduced in size by one or more processes chosen from a group consisting of jet mill, ultra-sonicator, ultrasonics, colloid-mill, ball-mill, bead-mill, sand-mill, dry milling and roll-mill; optionally, a paste composition has a tap density of the carbon nanotube agglomerates greater than about 0.02 $g/cm^3$; optionally, a paste composition comprises carbon nanotube agglomerates present in the range of about 1 to 15% by weight of paste; optionally, a paste composition has a dispersant is present in the range of 0.2 to about 5% by weight of the paste; optionally, a paste composition has a ratio of the dispersant weight to carbon nanotube agglomerates weight less than 1.

In some embodiments a method for making a paste composition comprises the steps: selecting carbon nanotube agglomerates; adding the carbon nanotubes agglomerates to a liquid vehicle to form a suspension; dispersing the carbon nanotubes agglomerates in the suspension; reducing the size of the carbon nanotube agglomerates to a Hegman scale of 7 or greater; and removing a portion of the liquid vehicle from the suspension to form a concentrated paste composition such that the paste composition has carbon nanotubes present in the range of about 1 to 15% by weight, a bulk electrical resistivity of about $10^{-1}$ $\Omega$-cm or less and a viscosity greater than 5,000 cps; optionally, a method further comprises the step of mixing a dispersant with the liquid vehicle before adding the carbon nanotube agglomerates; optionally, a method wherein the dispersing step is performed by a means for dispersing chosen from a group consisting of jet mill, ultra-sonicator, ultrasonics, colloid-mill, ball-mill, bead-mill, sand-mill, dry milling and roll-mill.

In some embodiments a paste composition consists of multi-walled carbon nanotubes of diameter greater than 4 nm; a dispersant chosen from a group consisting of poly(vinylpyrrolidone) (PVP), poly(styrene sulfonate) (PSS), poly(phenylacetylene) (PAA), poly(meta-phenylenevinylene) (PmPV), polypyrrole (PPy), poly(p-phenylene benzobisoxazole) (PBO), natural polymers, amphiphilic materials in aqueous solutions, anionic aliphatic surfactant, sodium dodecyl sulfate (SDS), cyclic lipopeptide biosurfactant, surfactin, water-soluble polymers, carboxyl methyl cellulose, hydroxyl ethyl cellulose, poly(vinyl alcohol), PVA, sodium dodecyl sulfate, SDS, polyoxyethylene surfactant, poly(vinylidene fluoride), PVdF, carboxyl methyl cellulose (CMC), hydroxyl ethyl cellulose (HEC), polyacrylic acid (PAA), polyvinyl chloride (PVC) and combinations thereof; and a liquid vehicle chosen from a group consisting of water, alcohols, ethers, aromatic hydrocarbons, esters, ketones, n-methyl pyrrolidone and mixtures thereof such that the paste composition has carbon nanotubes present in the range of about 1 to 15% by weight, a bulk electrical resistivity of about $10^{-1}$ $\Omega$-cm or less and a viscosity greater than 5,000 cps; optionally, a paste composition further consists of lithium ion battery electrode materials chosen from a group consisting of lithium, oxygen, phosphorous, nitrogen, nickel, cobalt, manganese, vanadium, silicon, carbon, aluminum, niobium and zirconium and iron wherein the paste composition is present in a range from about 2% to about 50% by weight and the viscosity is greater than about 5,000 cps; optionally, a paste composition further consists of a polymeric binder; optionally, a paste composition is contacting a metallic surface to form an electrode for a lithium ion battery and the liquid vehicle is removed.

In some embodiments a method of preparing an battery electrode coating using a paste composition as disclosed herein comprises the steps: mixing the paste composition with lithium ion battery materials; coating the paste onto a metallic film to form an electrode for a lithium ion battery and removing excess or at least a portion of the liquid from the coating; optionally, a method further comprises the step of mixing a polymeric binder with a liquid vehicle before mixing the paste composition with lithium ion battery materials; optionally, a method uses a polymeric binder chosen from a group consisting of polyethylene, polypropylene, polyamide, polyurethane, polyvinyl chloride, polyvinylidene fluoride, thermoplastic polyester resins, and mixtures thereof and is less than about 5% by weight of the paste composition; optionally, a method utilizes spherical carbon nanotube agglomerates fabricated in a fluidized bed reactor as described in Assignee's inventions U.S. Pat. No. 7,563,427, and U.S. Applications 2009/0208708, 2009/0286675, and U.S. Ser. No. 12/516,166. Optionally, a paste composition as disclosed herein utilizes spherical carbon nanotube agglomerates fabricated in a fluidized bed reactor as described in Assignee's inventions U.S. Pat. No. 7,563,427, and U.S. Applications 2009/0208708, 2009/0286675, and U.S. Ser. No. 12/516,166.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. All publications, patents, and patent applications cited herein are hereby incorporated by reference in their entirety for all purposes.

REFERENCES

References cited are incorporated herein in their entirety by reference.

[1] ZHAO, BIN, et al.; "Synthesis and Properties of a water-soluble single-walled carbon nanotube-Poly(m-aminobenzene sulfonic acid) graft copolymer; Adv. Funct. Mater. 2004, 14, No. 1, January, 71.
[2] LI, YADONG, et al.; "Bismuth Nanotubes: A Rational low-temperature Synthetic Route"; J. Am. Chem. Soc.; 2001, 123, 9904.
[3] LI, LAIN-JONG, et al.; "Comparative study of photoluminescence of single-walled carbon nanotubes wrapped with sodium dodecyl sulfate, surfactin and polyvinylpyrrolidone"; Instit. of Physics Publishing, nanotechnology; 16, (2005) S202.
[4] ZHANG, XIEFEI, et al.; "Poly(vinyl alcohol)/SWNT Composite Film"; Nano Letters 2003 Vol. 3, 9, 1285.
[5] LI, LAIN-JONG, et al.; "Chirality Assignment of single-walled carbon nanotubes with strain"; Phys. Rev. Letters, 93, 5, Oct. 2004, 156104-1.
[6] KIM, WOON-SOO, et al.; "Electrical Properties of PVdF/PVP Composite filled with carbon nanotubes prepared by floating catalyst method"; Macromolecular Research, 10, 5, 253, (2002).
[7] SHEEM, K. Y., et al.; "High-density positive electrodes containing carbon nanotubes for use in Li-ion cells"; Jl. Power Sources 158, (2006) 1425.
[8] SHEEM, K.Y., et al.; "Electrostatic heterocaoagulation of carbon nanotubes an LiCoO2 particles for a high-performance Li-ion cell"; Electrochimica Acta 55, (2010) 5808.
[9] LIU, X. M., et al.; "Sol-gel synthesis of multiwalled carbon nanotube-LiMn2O4 nanocomposites as cathode materials for Li-ion batteries"; Jl. Power Sources 195, (2010) 4290.
[10] HILL, JOHN; "How to uniformly disperse nanoparticles in battery cathode coating"; Advanced Materials & Processes, May 2010; 26.
[11] CHEN, N.; "Surface phase morphology and composition of the casting films of PVDF-PVP blend"; Polymer, 43, 1429 (2002).
[12] U.S. Pat. No. 7,365,100
[13] U.S. Pat. No. 7,008,563
[14] U.S. 2004/0038251
[15] U.S. Pat. No. 7,563,427
[16] U.S. Pat. No. 5,098,771
[17] U.S. Pat. No. 4,427,820
[18] U.S. Pat. No. 7,682,590
[19] U.S. Pat. No. 7,008,563
[20] U.S. Pat. No. 7,365,100
[21] U.S. Pat. No. 6,528,211
[22] U.S. Pat. No. 7,608,362
[23] U.S. Pat. No. 7,781,103
[24] U.S. Pat. No. 7,682,750
[25] U.S. Pat. No. 6,703,163
[26] U.S. Pat. No. 7,029,794
[27] U.S. 2007/0224106
[28] U.S. 2009/0208708
[29] U.S. 2009/0286675
[30] U.S. 2008/0038635
[31] U.S. 2010/0273050
[32] U.S. 2010/0021819
[33] U.S. 2010/0143798
[34] U.S. 2010/0176337

What we claim:

1. A battery electrode coating composition consisting of:
   multi-walled carbon nanotubes of diameter greater than 4 nm;
   a dispersant chosen from a group consisting of poly(vinylpyrrolidone) (PVP), poly(styrene sulfonate) (PSS), poly(phenylacetylene) (PAA), poly(meta-phenylenevinylene) (PmPV), polypyrrole (PPy), poly(p-phenylene benzobisoxazole) (PBO), natural polymers, amphiphilic materials in aqueous solutions, anionic aliphatic surfactant, sodium dodecyl sulfate (SDS), cyclic lipopeptide biosurfactant, surfactin, water-soluble polymers, carboxyl methyl cellulose, hydroxyl ethyl cellulose, poly (vinyl alcohol), PVA, sodium dodecyl sulfate, SDS, polyoxyethylene surfactant, poly(vinylidene fluoride), PVdF, carboxyl methyl cellulose (CMC), hydroxyl ethyl cellulose (HEC), polyacrylic acid (PAA), polyvinyl chloride (PVC) and combinations thereof;
   a liquid vehicle chosen from a group consisting of water, alcohols, ethers, aromatic hydrocarbons, esters, ketones, n-methyl pyrrolidone and mixtures thereof;
   lithium ion battery electrode materials chosen from a group consisting of lithium, oxygen, phosphorous, sulphur, nitrogen, nickel, cobalt, manganese, vanadium, silicon, carbon, aluminum, niobium and zirconium and iron;
   and wherein a paste composition consisting of the multi-walled carbon nanotubes, the dispersant and the liquid vehicle which has carbon nanotubes present in the range of about 1 to 15% by weight, a bulk electrical resistivity of about $10^{-1}$ Ω-cm or less, and a viscosity greater than about 5,000 cps, is present in a range from about 2% to about 50% by weight of the coating composition.

2. The battery electrode coating composition of claim 1 further consisting of a polymeric binder.

3. The battery electrode coating composition of claim 1 wherein the battery electrode coating composition is contacting a metallic surface to form an electrode for a lithium ion battery and the liquid vehicle is removed.

* * * * *